US007002617B1

United States Patent
Smith

(10) Patent No.: US 7,002,617 B1
(45) Date of Patent: Feb. 21, 2006

(54) COORDINATED AUDIO AND VISUAL OMNIDIRECTIONAL RECORDING

(76) Inventor: Robert Samuel Smith, 1263 Emory St., San Jose, CA (US) 95126

( * ) Notice: Subject to any disclaimer, the term of this patent is extended or adjusted under 35 U.S.C. 154(b) by 0 days.

(21) Appl. No.: 09/620,287

(22) Filed: Jul. 20, 2000

(51) Int. Cl.
H04N 7/14 (2006.01)

(52) U.S. Cl. ............................... 348/14.08; 348/14.16; 348/169; 348/208.14; 455/3.05; 455/3.06; 340/692

(58) Field of Classification Search ............. 348/14.01, 348/14.02, 14.04, 14.08, 14.16, 143, 169, 348/154, 155, 208.14, 208.16; 725/64; 704/264, 704/275; 455/3.05, 3.06; 340/692, 691.1; 367/135
See application file for complete search history.

(56) References Cited

U.S. PATENT DOCUMENTS

| | | | | |
|---|---|---|---|---|
| 4,360,827 A | * | 11/1982 | Braun ...................... | 348/14.09 |
| 4,862,278 A | * | 8/1989 | Dann et al. ............ | 348/240.99 |
| 5,561,518 A | * | 10/1996 | Parker et al. .......... | 356/139.06 |
| 5,594,494 A | * | 1/1997 | Okada et al. ............... | 348/14.1 |
| 5,734,590 A | * | 3/1998 | Tebbe .......................... | 700/94 |
| 5,798,798 A | * | 8/1998 | Rector et al. ................ | 348/476 |
| 5,940,118 A | * | 8/1999 | Van Schyndel .......... | 348/14.05 |
| 6,043,837 A | * | 3/2000 | Driscoll et al. ................ | 348/36 |
| 6,185,152 B1 | * | 2/2001 | Shen .......................... | 367/118 |
| 6,253,064 B1 | * | 6/2001 | Monroe ..................... | 455/66.1 |
| 6,304,285 B1 | * | 10/2001 | Geng .......................... | 348/36 |
| 6,333,826 B1 | * | 12/2001 | Charles ...................... | 359/725 |

(Continued)

OTHER PUBLICATIONS

US Pub. No. 2004/0100533 A1 to Allen et al.*
Kevin Wilson et al., "Audio–Video Array Source Separation for Perceptual User Interfaces", ACM International Conference Proceeding Series, Proceedings of the 2001 Workshop on Perceptive User Interfaces, Nov. 2001, Paper Session #2, pp. 1–7.*
Yong Rui et al., "Viewing Meetings Captured by an Omni–Directional Camera", Conference on Human Factors in Computing Systems, Proceedings of the SIGCHI Conference on Human Factors in Computing Systems, Mar. 2001, vol. No. 3, Issues No. 1, pp. 450–457.*
Ross Cutler et al., "Distributed Meetings: A Meeting Capture and Broadcasting System", International Multimedia Conference, Proceedings of the 10th ACM International Conference on Multimedia, Dec. 2002, Session #10: Meeting Support, pp. 503–512.*
US Pub. No. 2001/0015751 A1 to Geng.*

Primary Examiner—Anthony Knight
Assistant Examiner—Crystal J. Barnes
(74) Attorney, Agent, or Firm—Robert Samuel Smith

(57) ABSTRACT

A surveillance system featuring a camera that is directed to focus on a location where a noise has been generated and display an image of the location. The system includes an omnidirectional camera having a lens for viewing a 360° field of view, a visual memory for storing visual data at addresses representing the field of view, an omnidirectional audial detector for detecting the direction of location of a source of a signal, a display selection means for selecting visual data from one of said addresses in said visual memory corresponding to said direction of location and a monitor for displaying said selected visual data. In one embodiment, the audial detector is a plurality of detectors arranged on a circle. A register stores the address of the detector closest to the source and this address is transmitted to the display controller which conditions a system monitor to display an image representing the selected visual data.

8 Claims, 6 Drawing Sheets

U.S. PATENT DOCUMENTS

| | | | |
|---|---|---|---|
| 6,469,732 B1 * | 10/2002 | Chang et al. | 348/14.08 |
| 6,593,956 B1 * | 7/2003 | Potts et al. | 348/14.09 |
| 6,618,073 B1 * | 9/2003 | Lambert et al. | 348/14.08 |
| 6,707,489 B1 * | 3/2004 | Maeng et al. | 348/211.12 |
| 6,731,334 B1 * | 5/2004 | Maeng et al. | 348/211.12 |
| 6,754,373 B1 * | 6/2004 | de Cuetos et al. | 382/118 |
| 6,766,035 B1 * | 7/2004 | Gutta | 382/103 |
| 6,781,606 B1 * | 8/2004 | Jouppi | 345/698 |
| 6,788,333 B1 * | 9/2004 | Uyttendaele et al. | 348/36 |
| 6,788,337 B1 * | 9/2004 | Fujii | 348/207.99 |
| 6,795,106 B1 * | 9/2004 | Cooper | 348/14.08 |

* cited by examiner

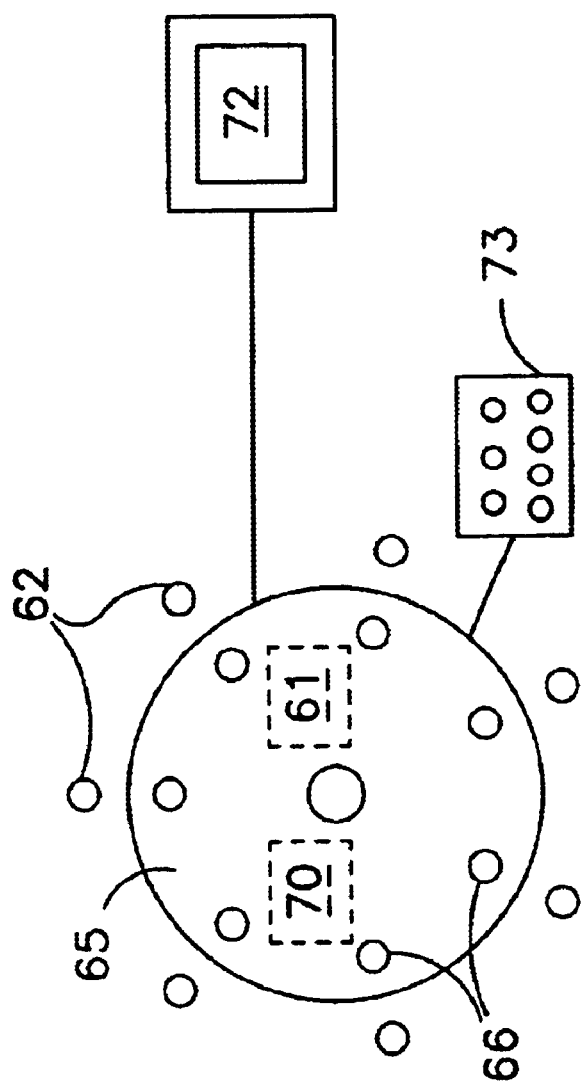

COORDINATED AUDIO AND VISUAL OMNIDIRECTIONAL RECORDING

FIELD OF THE INVENTION

This invention relates to simultaneous recording of panoramic visual data and panoramic audio data and the application of the directed audio (or radiated) signal to focus the visual recording on the source of the directed audio signal.

BACKGROUND AND INFORMATION DISCLOSURE

This invention relates to simultaneous recording of panoramic visual data and panoramic audio data and the application of the directed audio (or radiated) signal to focus the visual recording on the source of the directed audio signal.

BACKGROUND AND INFORMATION DISCLOSURE

The use of video photography has evolved steadily over the past forty years in its application to surveillance situations and environments. Applications include stationary systems such as are found in commercial establishments, and on moving bases such as robots, submarines, vehicles, etc.

For example, U.S. Pat. No. 6,016,385 to Yee et al discloses a real time remotely controlled robot having a head with a pair of television cameras (eyes) and a pair of microphones (ears) and a pair of arms mounted on a mobile trunk. An operator located at a command center receives audio and visual signals from the robot and, in response, issues commands that control movement of the trunk and arms to perform tasks.

U.S. Pat. No. 4,453,085 to Pryor discloses an electro-optical system for monitoring the positioning of a movable arm.

U.S. Pat. No. 4,604,559 to Hawkes et al discloses a robot controlled by a user wherein an audio signal is fed back from the robot to the user regarding force and movement parameters of the robot operation.

U.S. Pat. No. 5,299,288 to Glassman et al discloses an image directed robot system for surgical applications including an optical tracking camera supplying data to the controlling processor.

One of the major developments in video photography in recent years has been the panoramic camera. According to this technology a lens with a 360° field of view stores the entire field in memory and various areas are selected and projected according to the interests of the viewer. This technique has many applications, for example, in real estate advertisements where features of the location are selected and enlarged for detailed examination by the viewer.

U.S. Pat. No. 5,920,337 to Glassman et al discloses an omnidirectional visual image detector and processor (incorporation herein by reference). There is described a reflective round lens (either a cone or spherical section) which reflects the object beam from a surrounding field of view (encircling the lens) to a direction parallel to the axis of the rotund lens. The beam then passes through an objective lens and is focused onto a CCD (charge coupled device) where image data is detected and processed for storage or image presentation on a monitor.

In the context of this specification, the term, "visually examine" means that, a narrow field of view is selected covering a few degrees from an entire 360° field of view recorded by a panoramic video camera.

SUMMARY OF THE INVENTION

It is an object of this invention to develop a surveillance device that enables a user to visually examine a location that has a source of a signal. The signal is an audial signal in one version or an electromagnetic signal (radio, microwave, light, infrared, etc) in another version.

This invention is directed toward an omnidirectional camera having a lens for viewing a 360° field of view; a visual memory for storing visual data at addresses representing the field of view; an omnidirectional detector for detecting the direction of location of signal source. A display selection circuit is provided for selecting visual data from an address in the visual memory corresponding to the direction of location. The visual data is displayed on a system monitor.

In one version, a directional audio detector and a panoramic CCD (charge coupled device) camera installed in the center of a site, (e.g., store, prison yard, battlefield, etc.) The camera is continually generating visual data of a 360° view of the site. If a sound is generated from a location in the site, (an intruder, a shout, a shot, etc.) Then the audio receiver of this invention will detect the sound and its direction relative to the camera and direct the camera to display that portion of the stored data representing the visual image of the source.

Another object of the invention is to provide a panoramic audio detector that is capable of receiving an audio signal from a source located any where on a 360° circumference around the audio detector, "point" to the location of the source of sound and then amplify the audio signal for more detailed examination of the sound.

The data corresponding to the direction of the source of sound is used to control the display selected from the visual data stored by the camera.

In one embodiment, the panoramic audio detector of this invention comprises a plurality of audio detectors, strung one after the other on a circle. Each audio detector comprises a piezo electric element, a flip-flop, and coupling circuitry between the piezo electric element and its respective flip-flop. The coupling circuitry enables the piezo element to set its respective flip-flop at the instant a sound impulse is received by the piezoelectric. The direction of the source of sound will determine which flip-flop is set before all the other flip-flops. The first flip-flop to be set will store its address (referred to herein as the "source address") in a central register and the central register will ignore signals from all other flip-flops during the sampling period.

The register will thereby have stored an address corresponding to the direction of the source. This address is used to select camera data from the panoramic camera for localized display of the source of sound.

The phase of the sound signal reaching the detector closest to the source will be ahead of the phases of the same sound signal reaching the other (more distal) detectors. The invention includes an audio "focusing" circuit that adjusts the phase of the signal from each detector so that each signal from the respective detector is in phase with the detector nearest the source of sound. An adder adds together all of the phase adjusted signals to generate a "summation sound" signal from the source.

In another embodiment, a focusing circuit coupled to the panoramic camera displays the image of a location in response to motion in that location. The panoramic viewing system has two video memories, and a comparator that is configured to compare point by point image data at each memory address of one visual memory to data at the corresponding addresses of the other visual memory. A difference between a signal stored at one address in one memory and the signal at the same address in the other memory indicates motion at the location and this difference causes the circuit to display the image of the location where motion has occurred.

BRIEF DESCRIPTION OF THE FIGURES

FIG. 6 shows a version of the invention being a panoramic teleconference table.

DESCRIPTION OF ILLUSTRATIVE EXAMPLES

Figure 1:
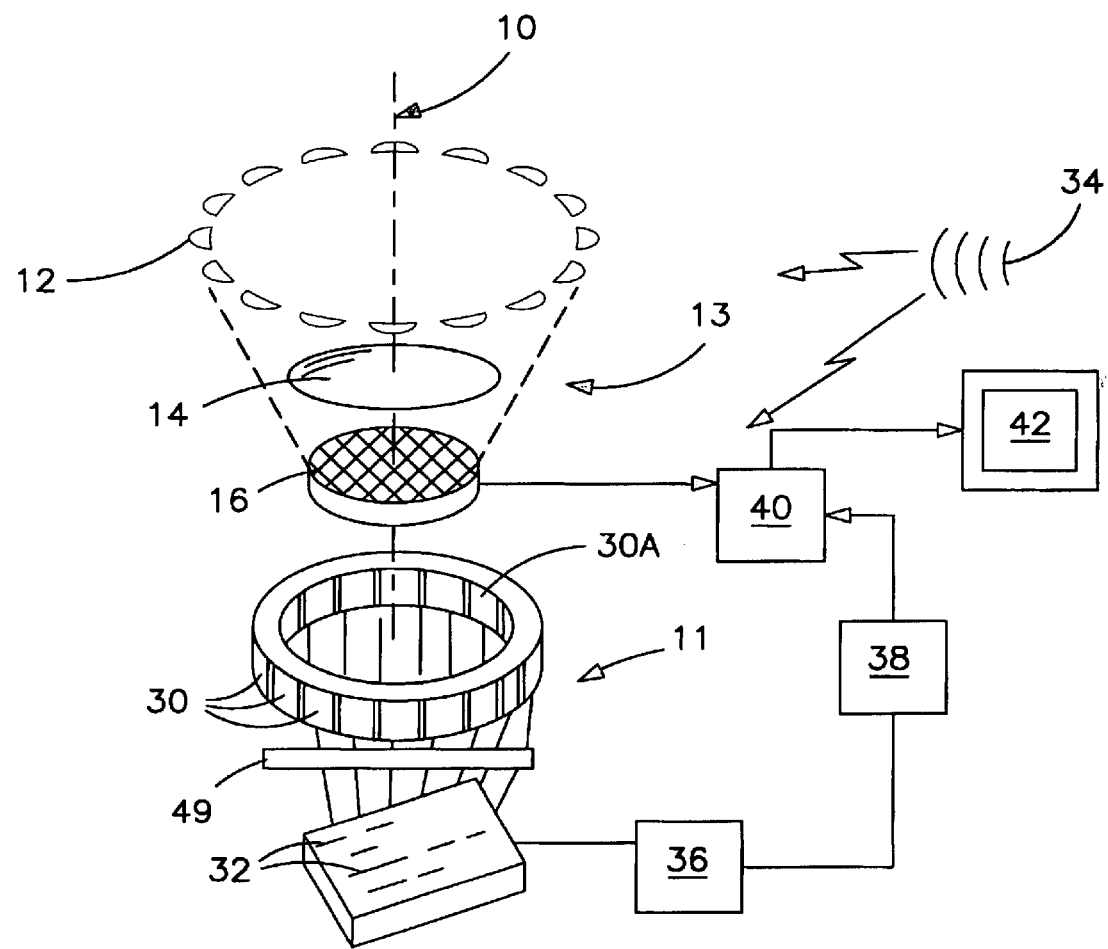
FIG. 1 shows an audial omnidirectional detector of this invention.

Turning to a discussion of the drawings, FIG. 1 is a schematic diagram of one version of the invention 10 in which the directional function of the panoramic camera responds to a sound coming from a source at a location on the circumferential field of view.

There is shown an omnidirectional visual imaging system 13 including an array of "sub" lenses 12, focusing lens 14 and charge coupled device array 16. The omnidirectional visual imaging system 13 is of the type disclosed by U.S. Pat. No. 5,920,337 to Glassman. Which is incorporated herein by reference.

An audio detector system 11 is shown as a string of detectors 30 mounted on a circle that is coaxial with an axis 18 of the lens 12, The detectors 30 are preferably piezo electric, capacitive, semiconductor elements of similar pressuresensitivedevices well known in the art.

Each detector 30 is coupled to a selection circuit 49 that responds to the first detector to receive a sound wave radiated from a source 34 by shutting off the signals from all of the other detectors. Sound generated by a source 34 from a location on the circumferential field of view reaches first the detector 30A closest to the source 34 before it reaches the other detectors thereby shutting off the signals from all of the other detectors. An address register 36 registers the address of the closest detector 30A and ignores the signals from the remaining audial detectors 30. The registered address is applied to display control circuit 38. The visual display circuit 38 selects the visual data from the corresponding address in the video memory 40 and displays an image of the location on the system monitor 42.

Also displayed is a number indicating the azimuth direction of the source of sound relative to the camera.

Figure 2B:
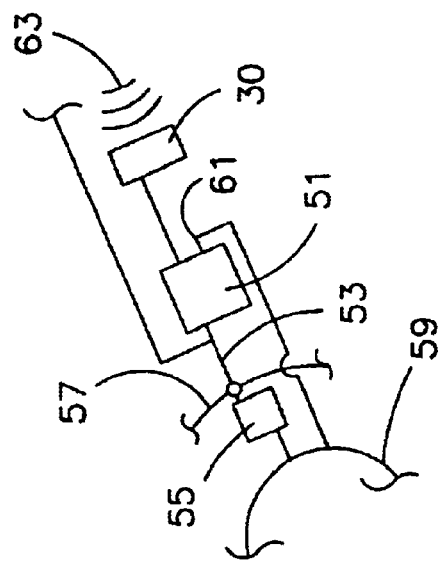
FIGS. 2A and 2B show one embodiment of a selection means.
Figure 2A:
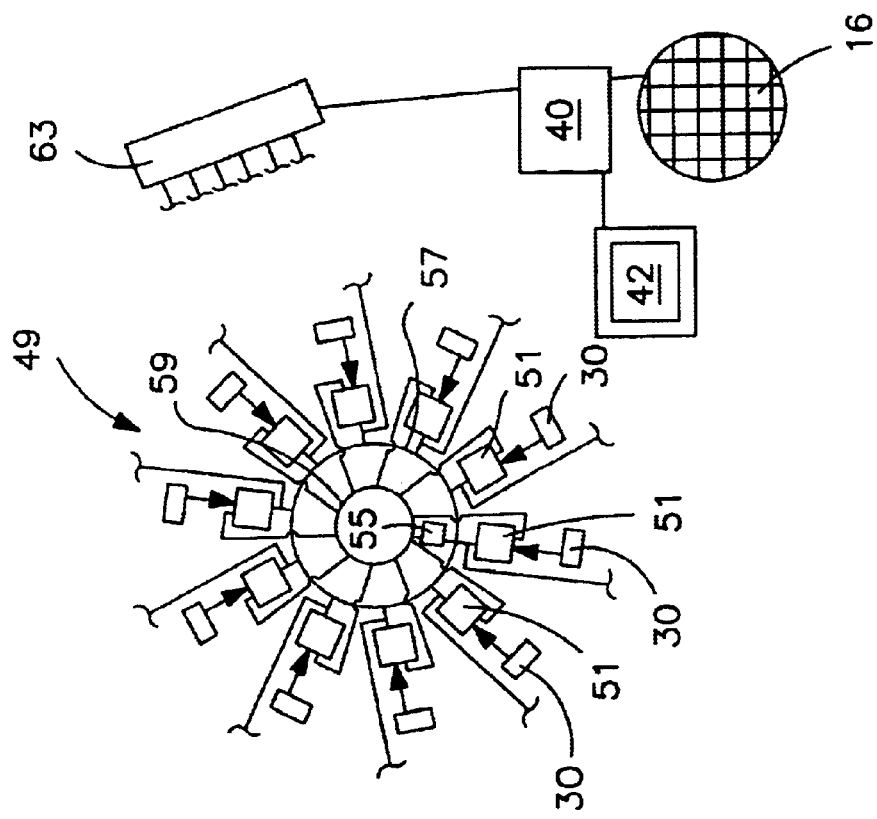

One embodiment of a selection circuit 49 is shown in FIG. 2A showing an array (ring) of audial detectors 30. FIG. 2B shows a portion of circuit 49 to better advantage than FIG. 2A. The output terminal of each audial detector 30 is connected to an input terminal of an AND gate 51. Each detector 30 has its own AND gate 51.

The output terminals of all AND gates 51 have two connections:
(i) One connection 63 is to an address register
(i) One connection 63 is to an address register (36 in FIG. 1) which activates display control circuit 38 (FIG. 1) to send an image signal stored in video memory 40 representing that portion of the field of view to a video monitor 42.

(ii) The second connection of all output terminals 53 of all the AND gates 51 is connected to a bus 57. Bus 57 is connected to an input terminal of a single inverter 55 whose output terminal is connected to bus 59. Bus 59 is connected to a second input terminal 61 of all AND gates 51.

Initially there is no sound incident on any of the detectors so that the input signal to all of the gates 51 is zero. When a sound signal is radiated from a sound source, the closest detector is the first to receive the signal and sends a positive signal to one input of its gate Since the signal on the second input terminal is zero (not negative) the first gate to receive the signal from its detector 30 will send a signal to the address register 63. The positive signal from the first gate to receive the sound signal is inverted by inverter 55 and the negative signal is applied through the second bus 59 to the second input terminal of all the remaining gates thereby turning off all remaining gates.

The video memory 40 reads the selected address from register 63 and applies the image data on monitor 42.

Figure 4:
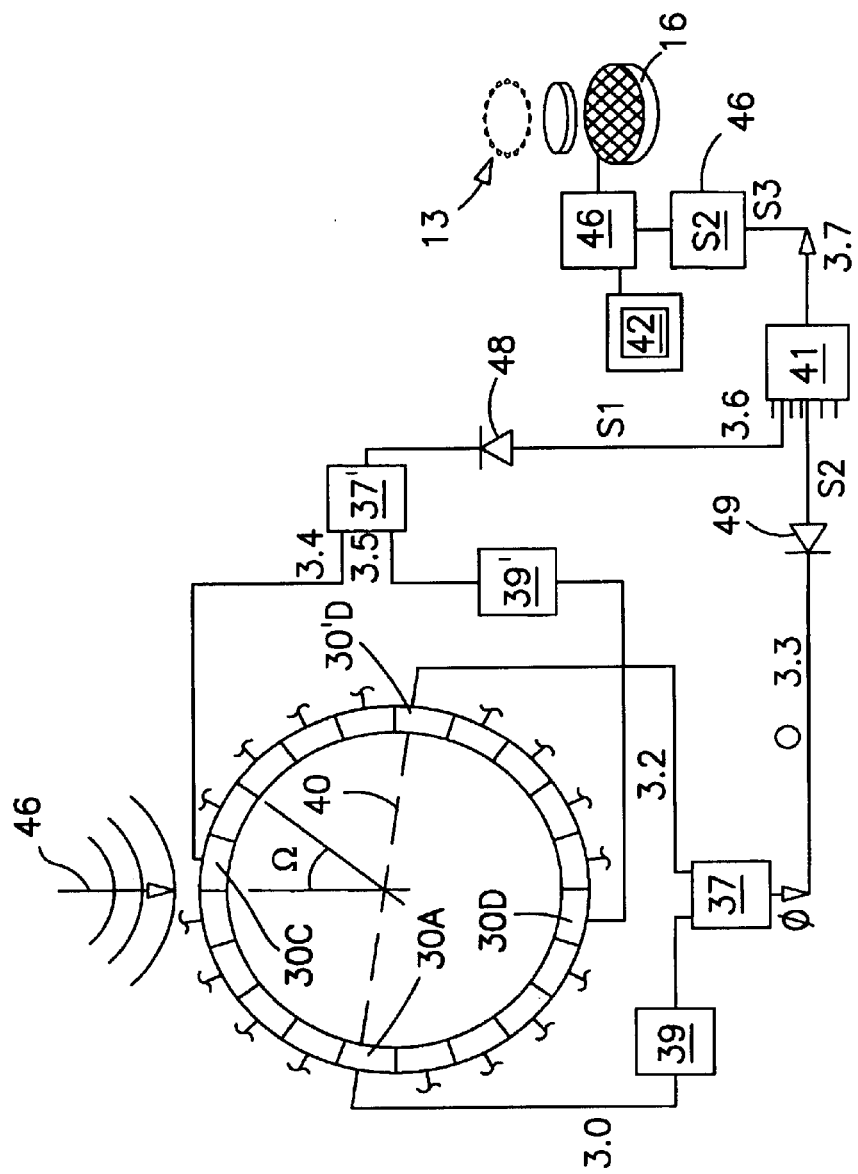
FIG. 4 shows another embodiment of a selection technique.

An alternate scheme for detecting the direction of the sound is shown in FIG. 4. There is shown a ring of audial detectors 30 arranged relative to the omnidirectional lens. The lens is not shown in FIG. 4 but is arranged coaxial with the audial detector array as discussed with regard to FIG. 1.

Each detector 30 of the array of detectors forms a pair of detectors with one member of each pair being positioned on a circumferential boundary oppositely from another member of the pair. For example, detectors 30A and 30B form one pair, detectors 30C and 30D form another pair. A plurality of difference circuits 37 is provided although only two difference circuits are shown in FIG. 4: a difference circuit for each pair of detectors, one pair of detectors for each difference circuit 37.

FIG. 4 shows inverters 39 (two are shown),
one inverter for each pair of detectors, one pair of detectors for each inverter;
rectifiers 49, one rectifier 49 for each pair of detectors 30, one pair of detectors 30 for each rectifier 49;
An address register 41 having a plurality of address input terminals, one address terminal for one difference circuit and one difference circuit for one address terminal;
one member of each pair of detectors 30 is connected to transmit an image signal to an input terminal of one of the inverters 39;
an output terminal of the inverter is connected to an input terminal of one of the difference circuits;
another one of each pair of detectors is connected to another input terminal of its difference circuit;
each one of the rectifiers 49 has an input terminal connected to an output terminal of the difference circuit 37;
each one of the rectifiers 49 has an output terminal connected to one of the input terminals of the address register 41.
the address register has an output terminal configured to emit an address signal responsive to a null signal from one of the rectifiers.

Figure 3:
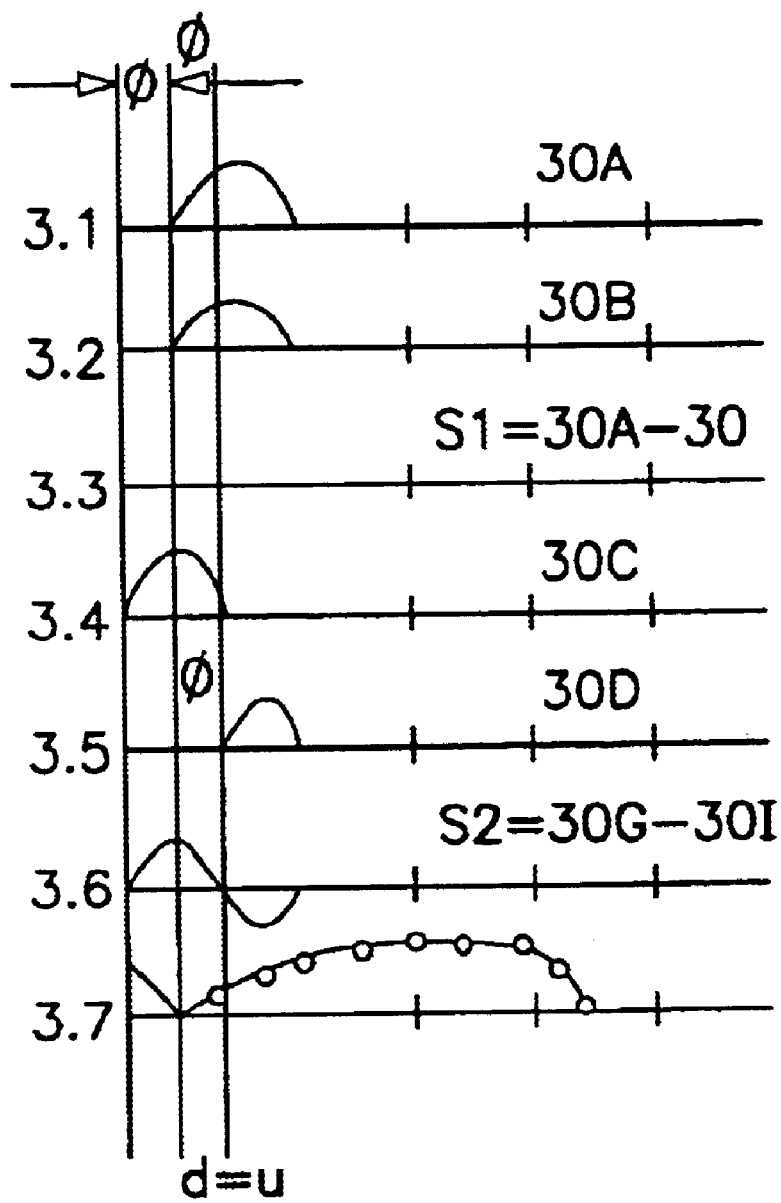
FIG. 3 is a timing diagram of the embodiment of FIG. 4.

The timing diagrams of FIGS. 3.1–3.7 show the signals generated by a sound pulse 46 incident on the array of detectors 30. Detector 30C is the "leading" detector where the phase shift of the incoming wave will be assumed to be zero as shown in FIG. 3.4. FIGS. 3.1 and 3.2 show that the signals received by detectors 30A and 30B have shifted an equal amount, Ø, so that the difference between their signals (FIG. 3.3) is zero. The inverted signal, FIG. 3.5, from detector 30D has shifted by 2Ø thereby giving pulse 3.6.

FIG. 3.7 is a plot of the peak output of each difference circuit 37 vs. Ø. Interpolation of the plot to Zero yields the value of Ø being the direction of the sound 46.

When no sound is incoming, the output $S_3=0$ (FIG. 3.7). When a sound wave 46 is incident on the array 30, then a finite pulse 3.7 is generated from the respective one of the difference circuits that stores the signal in the register at its azimuthal address Ø Selection circuit 45 then applies the address Ø to video memory 46 to locate the video data corresponding to the source of the sound 46. Video memory 46 is connected to CCD array 16 for storing an image signal generated by the CCD 36 responsive to the visual image of the surrounding field formed by omnidirectional lens 13. The selected image data is presented on video monitor 42. Not shown in FIG. 2 but shown in FIG. 1, the axis of the audial array is coincident with the axis of the omnidirectional lens 13.

Figure 5:
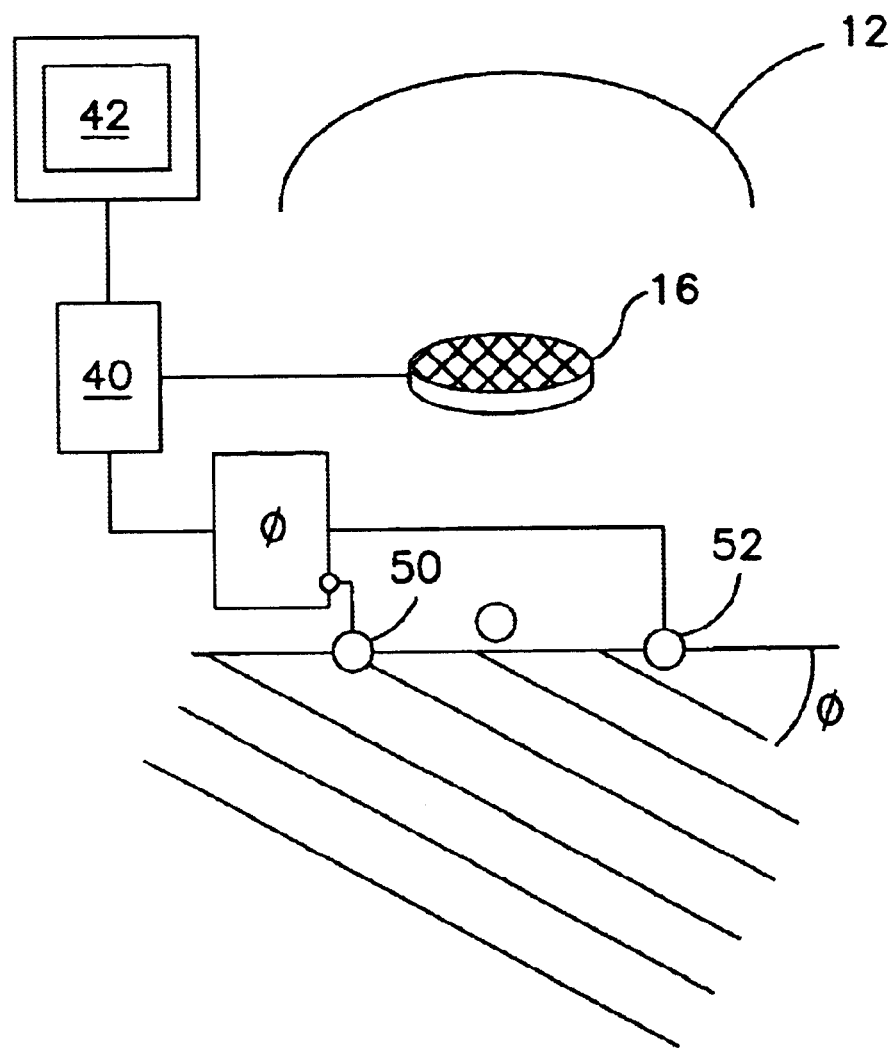
FIG. 5 show an audial array having two detectors.

FIG. 5 shows another embodiment of the invention being a system which relies on the phase difference of the sound wave between a pair of audial detectors 50 and 52, spaced a distance, D, from one another to present on a video monitor 42 an image of an area of a field of view formed by an omnidirectional lens 13 on a CCD array and stored in video memory 40.

If P represents the period between the arrival of the earliest detectable portion of a sound signal, (such as a shot) to each detector.

The velocity of sound is C. Then the angle, Ø, of the direction of the sound relative to the audio detector line is $$\cos Ø = PC/D$$

In practice, visual data is stored in the visual memory 40 at addresses corresponding to the angle Ø. The phase detector 51 measures the time period P being the difference in times of arrival of the signal from source S to the first audial detector 50 and detector 52. The value of Ø, calculated by th formula, gives the address of the image data for generating a local image to be displayed directly on the monitor 42.

Several embodiments have been described of a surveillance system being a combination of audial detectors that sense the direction of an incoming sound wave and a visual system that presents an image of the area includes the source of the sound.

Other variations and modification of this invention may be contemplated after reading the specification and studying the drawings that are within the scope of the invention.

For example other forms of lens (other than an omnidirectional lens may be used to collect the image data.

FIG. 6 shows an embodiment for application in televising a conference. The conferees 62 (seven are shown) are located (seated) at locations around a panoramic camera 64 positioned on a support 65 (e.g., table). Each location has a microphone 66. Each location is viewed through a corresponding section of the lens of camera 64. When the voice of the conferee 62 nearest a particular microphone 66 at the conferee's location is detected by the microphone 66, the voice signal is amplified and transmitted to signal selection controller 70 which conditions the panoramic camera 64 to project the image formed by the corresponding section 68 on the monitor 72. The signal selection controller 70 is shown in phantom in FIG. 6 because it is preferably located under the table 65.

In another arrangement, the signal selection means includes an array of buttons (switches) on a console 73. Each switch, when closed, connects a selected one of the microphones 66 to a source of power enabling the selected microphone 66 to convert sound to an electrical signal for transmission to the monitor coincident with selection of the corresponding section of the field of view for viewing on the monitor. In this arrangement, selection of the microscope occurs simultaneously with the selection of the video signal for viewing corresponding to the selected microphone.

In other versions, the system is mountable on a cart or robot and transportable into an otherwise inaccessible environment.

the principles of the invention are adaptable to underwater surveillance.

the system may be adapted to use at night by using a visual system that is sensitive to infrared.

The audial detector in various embodiments include piezoelectric detectors, capacitive detectors and semiconductor detectors such as are well known in the art.

I therefore wish to define the scope of the invention by the appended claims.

What is claimed is:

1. A surveillance system which comprises;
    a camera means for forming an image of a 360° field of view around a viewpoint having a CCD array arranged to receive said image and generate an image signal,
    video memory means coupled to said CCD array for storing said image signal;
    a plurality of audial detectors arranged at positions around said viewpoint:
    a plurality of circuit means, one circuit means for each one audial detector, each circuit means arranged to provide that, when any one audial detector detects a sound coming from said 360° field of view before any other of said audial detectors detects said sound, then said circuit means coupled to said any one audial detector disables all other detectors of said plurality of audio detectors and emits a position signal providing that said any one audio detector emitting said position signal corresponds to said direction of said source of sound relative to said viewpoint;
    signal selecting means arranged in operable combination with said plurailty of audial detectors and said video memory means for applying said position signal to select exclusively from said memory a portion of said image signal generated from said area containing said source of sound;
    monitor means in combination with said signal selecting means for applying said portion of image signal to display an image of said area.

2. The surveillance system of claim 1 wherein said audial detector comprises:
    two detectors spaced a distance, D, from one another and having identical detection sensitivities;
    said signal arriving at one of said detectors at one instant and arriving a period of time, P, later at said second detector;
    means for measuring the period of time, P;
    means for calculating a direction angle, Ø, being the angle which the direction from the audial detector to the source makes with the line connecting the two detectors using the relation:

$$\cos Ø = PC/D$$

where c is the velocity of sound;
    said display selection means applying the angle, Ø, to identify the address in visual memory of the visual data.

3. The surveillance system of claim 1, arranged to display a meeting of a group of conferees, wherein
    each conferee is positionable at a respective one of a group of locations in said 360° field of view of said omnidirectional lens and each conferee is a source of sound from said respective location;

said plurality of audio detectors being a signal selecting means, further comprising a group of microphones, each one of said audio detectors and one of said group of microphones positioned at a respective one of said locations and corresponding to said direction, being one of a group of directions of said conferees relative to said camera means;

said signal selecting means arranged in operable combination with said camera means for selecting a portion of said image signal generated from one of said locations in response to sound generated at said location by one of said conferees at said location for presentation on said monitor.

4. The surveillance system of claim 1 arranged to display a meeting of a group of conferees, which comprises:

each conferee positionable at a respective one of a group of locations in a said 360° field of view and each conferee being a source of sound from said respective location;

said plurality of detectors comprising a group of microphones, each positioned at a respective one of said locations and corresponding to said direction, being one of a group of directions of said conferees relative to said camera means;

said signal selecting means arranged in operable combination with said group of microphones and said camera means for selecting a portion of said image signal generated from one of said locations for presentation on said monitor.

5. The surveillance system of claim 4 wherein said signal selecting means comprises:

a group of switches, one of said switches connecting a power means to one of said microphones respectively whereby said power means enables said microphone to convert an audio signal to an electrical signal for transmission to said signal selecting means and to select said portion of said image signal corresponding to said location where said microphone is located for presentation on said monitor when said respective switch is closed;

said group of switches accessible to an operator enabling said operator to select any one of said sections for transmitting an image and sound.

6. The surveillance system of claim 1 wherein said plurality of audial detectors are aranged circumferentially around said viewpoint and coaxial with said 360° field of view.

7. The system of claim 6 wherein said circuit means comprises:

a plurality of AND gates, each gate connected to only one of said plurality of audial detectors, each audial detector coupled to only one of said AND gates to transmit an image signal from each said audial detector to one input terminal of said respective AND gate;

a first bus connected to an output terminal of each AND gate;

an inverter having an input terminal connected to said first bus;

a second bus connected to an output terminal of said inverter and to a second input terminal of said AND gate;

an address register connected in operable combination with said plurality of AND gates for storing in said address register an address of one of said AND gates in response to an image signal received from said AND gate;

said address expressed as an angular position of said detector in said plurality of detectors; and said selection means connected to said register comprising means for selecting from said video memory said portion of said image signal generated from an area containing said source of sound and having an address stored in said register whereby a source of sound generates a sound wave that is incident on a nearest detector of said plurality of detectors enabling said selection circuit to read said address of said nearest detector.

8. The system of claim 6 wherein said circuit means comprises:

each audial detector of said plurality of detectors forming a pair of detectors with one member of said pair being positioned on a circumferential boundary oppositely from another member of said pair;

a plurality of difference circuits, one difference circuit for each pair of detectors, one pair of detectors for each difference circuit;

a plurality of inverters, one inverter for each pair of detectors, one pair of detectors for each inverter;

a plurality of rectifiers, one rectifier for each pair of detectors, one pair of detectors for each rectifier;

an address register having a plurality of address input terminals, one address terminal for one difference circuit and one difference circuit for one address terminal;

one member of said pair of detectors connected to transmit an image signal to an input terminal of one of said plurality of inverters;

an output terminal of said inverter connected to an input terminal of one of said plurality of difference circuits;

another one of each pair of detectors connected to another input terminal of its difference circuit;

one of said plurality of rectifiers having an input terminal connected to an output terminal of said difference circuit;

each one of said rectifiers having an output terminal connected to one of said input terminals of said address register;

said address register having an output terminal configured to emit an address signal responsive to a null signal from one of said rectifiers.

* * * * *